United States Patent [19]

Kolloff et al.

[11] Patent Number: 5,451,776

[45] Date of Patent: * Sep. 19, 1995

[54] HIGH RESOLUTION OPTICAL HYBRID DIGITAL-ANALOG LINEAR POSITION ENCODER

[75] Inventors: Bruce G. Kolloff, Sussex, N.J.; Jeffrey S. Schoenwald, Thousand Oaks, Calif.; Steve Beccue, Oxnard, Calif.; Mohsen Khoshnevisan, Newbury Park, Calif.

[73] Assignee: Rockwell International Corporation, Seal Beach, Calif.

[ * ] Notice: The portion of the term of this patent subsequent to Aug. 9, 2011 has been disclaimed.

[21] Appl. No.: 169,474

[22] Filed: Dec. 17, 1993

Related U.S. Application Data

[63] Continuation-in-part of Ser. No. 907,412, Jul. 1, 1992, Pat. No. 5,336,884.

[51] Int. Cl.[6] .............................................. G01D 5/34
[52] U.S. Cl. ............................ 250/231.18; 250/231.14
[58] Field of Search ..................... 250/231.13, 231.14, 250/231.18, 237 G; 356/375; 33/707

[56] References Cited

U.S. PATENT DOCUMENTS

| | | | |
|---|---|---|---|
| 3,058,001 | 10/1962 | Dertouzos | 250/231.14 |
| 3,982,106 | 9/1976 | Stutz | 250/237 G |
| 4,602,242 | 7/1986 | Kimura | 250/231.18 |
| 4,633,224 | 12/1986 | Gipp et al. | 250/231.18 |
| 4,914,437 | 4/1990 | Kibrick et al. | 250/231.18 |
| 5,068,529 | 11/1991 | Ohno et al. | 250/231.18 |
| 5,073,711 | 12/1991 | Brininstool et al. | 250/231.18 |

*Primary Examiner*—David C. Nelms
*Attorney, Agent, or Firm*—John J. Deinken

[57] ABSTRACT

An interferometrically readable optical encoder for sensing linear position includes an optical medium movable in a linear direction and having a data storage layer, a plurality of uniformly sized sectors being defined in the layer. A linear absolute track is defined in the layer parallel to the linear direction and a plurality of absolute marks is formed in the layer in sequence along the absolute track within each sector, each such absolute mark being detectable by interferometric reflection of coherent light as representative of a binary 1 or a binary 0 and each such plurality of absolute marks defining a binary word. A linear incremental track is defined in the layer parallel to the linear direction with a series of incremental marks formed in the layer and evenly spaced along the first incremental track, each such incremental mark being detectable by interferometric reflection of coherent light. The binary word in a sector is read to identify the position of that sector in the linear direction and indicate the approximate position of the medium. The incremental marks refine the approximate position indication to provide a more precise position of the medium.

30 Claims, 6 Drawing Sheets

HIGH RESOLUTION OPTICAL HYBRID DIGITAL-ANALOG LINEAR POSITION ENCODER

CROSS REFERENCE TO RELATED APPLICATION

This application is a continuation-in, part of application Ser. No. 07/907,412, filed Jul. 1, 1992, now U.S. Pat. No. 5,336,884.

BACKGROUND OF THE INVENTION

This invention is concerned with optical encoders which are used to measure accurately the linear displacement of an object. More particularly the invention relates to a technique for optically ascertaining the position of an object using a combination of digital and analog sensing.

The need for precision measurement in a variety of devices demands an inexpensive, high resolution method for ascertaining position. Stepper motors, for example, as used in such diverse applications as gun turrets, paper making plants, machine tools, direct drive motors, and robotics applications, require a high precision indication of angular position. Such angular displacement information may be utilized in subsequent process steps or as a feedback indicator of system error and misalignment. Similarly, linear position measurements utilizing linear scales are required in many applications.

Prior art linear encoders are usually incremental and employ a scale having a series of abbreviated lines spaced uniformly over the length of the scale coupled with a multiple channel reader to directly read the position of the encoder in a binary format. While such a system is simple and inexpensive, it does not provide the accuracy required by modem high precision instrumentation.

Other prior art encoders use laser technology, such as the laser incremental encoder model X-1, manufactured by Canon. A complex series of prisms in this device is used to produce 225,000 sinusoidal waves per revolution. The 225,000 waves are each further subdivided into 80 pulses per wave to yield 18 million pulses per revolution. The principle employed in the laser rotary encoder is that of a grating disk having a series of radially oriented bars about its outer periphery. The radially oriented bars are very small and must be positioned on the disk with great precision. A grating disk having the required grating bar tolerances for the laser rotary encoder is difficult and expensive to fabricate. Furthermore, the grating disk is required to be used in conjunction with a phase plate having similarly strict manufacturing requirements.

The cost of such high precision encoders is consequently quite prohibitive. Furthermore, because of the electronic components in such an apparatus, there are limitations on the operating environment in which such an encoder may be employed. The operating temperature of the encoder must remain within a temperature range of approximately 10° C. to 40° C. Otherwise, not only may inaccuracies be introduced into the measurements, but the encoder may be damaged or destroyed. Consequently there is a need in some low and high temperature position measurement applications to employ a device which does not require any electronic components in the position encoder head.

Application Ser. No. 07/907,412, filed Jul. 1, 1992, describes an angular position encoder having a precision and resolution which exceeds that available for encoders in its class. Also needed, however, is a linear position encoder with a cost considerably less than that associated with a complex laser encoder, but with a resolution much greater than that obtainable with a standard direct digital read encoder.

SUMMARY OF THE INVENTION

By adapting compact optical disk technology to the measurement of linear displacement, this invention provides a new technique for achieving high precision measurement of linear position with a significant reduction in the manufacturing cost of the measurement apparatus.

An interferometrically readable optical encoder for sensing linear position includes, according to this invention, an optical medium movable in a linear direction and having a data storage layer, a plurality of uniformly sized sectors being defined in the layer; a linear absolute track defined in the layer parallel to the linear direction; a plurality of absolute marks formed in the layer in sequence along the absolute track within each sector, each such absolute mark being detectable by interferometric reflection of coherent light as representative of a binary 1 or a binary 0 and each such plurality of absolute marks defining a binary word; a first linear incremental track defined in the layer parallel to the linear direction; and a first series of incremental marks formed in the layer and evenly spaced along the first incremental track, each such incremental mark being detectable by interferometric reflection of coherent light. With this arrangement, the binary word in a sector can be read to identify the position of that sector in the linear direction and thereby indicate the approximate position of the medium. In addition, the first series of incremental marks can be detected to refine the approximate position indication and thereby indicate a more precise position of the medium.

In a more particular embodiment, the linear absolute track includes at least one start mark formed in the absolute track within each sector and having a common value in all sectors to indicate the start of a sector and the binary word within each sector is assigned a unique value identifying the sector.

Additional accuracy may be obtained by adding a second linear incremental track defined in the layer parallel to the linear direction, with a second series of incremental marks formed in the layer and evenly spaced along the second incremental track. Each such incremental mark is detectable by interferometric reflection of coherent light, the number of marks in the second series being equal to the number of marks in the first series, but with each mark within the second series being displaced in the linear direction with respect to a corresponding mark in the first series by an amount equal to one eighth the spacing of the marks in the first series. Similarly, third and fourth linear incremental tracks may be added as desired to achieved higher levels of accuracy.

The encoder may also include a source of coherent light for illuminating the layer at a fixed position; an absolute track detector for detecting the portion of the illumination reflected from the marks within the absolute track; a first incremental track detector for detecting the portion of the illumination reflected from the marks within the first incremental track; and signal processing and decoding means for converting the output of the absolute track detector into a binary word and for interpolating the precise position of the medium from the output of the first incremental track detector.

A read head may slidably engage the optical medium, with an absolute track optical collimator affixed to the read head for conveying light from the source of light to the absolute track and for conveying light reflected from the absolute track to the absolute track detector. An absolute track optical coupler is then connected between the source of light, the absolute track optical collimator, and the absolute track detector, with an absolute track optical fiber coupling the absolute track optical coupler to the absolute track optical collimator. A first incremental track optical collimator is affixed to the read head for conveying light from the source of light to the first incremental track and for conveying light reflected from the first incremental track to the first incremental track detector, a first incremental track optical coupler is connected between the source of light, the first incremental track optical collimator, and the first incremental track detector, and a first incremental track optical fiber couples the first incremental track optical coupler to the first incremental track optical collimator.

DESCRIPTION OF THE INVENTION

This invention provides a new technique for precision sensing of linear position using a hybrid analog/digital optical encoder, with the precision depending upon the number of tracks used. In the particular embodiments discussed below, for example, linear displacement can be resolved to within 1/1,000; 1/10,000; 1/40,000; or 1/160,000 of an inch. Additional improvements in resolution will be possible as advances are made in photolithography, scale fabrication, and shorter wavelength lasers.

The inventive solution employs a new approach to optical position encoding which takes advantage of the existing body of technology developed for the manufacture, recording, and reading of compact disks. Compact disk technology utilizes interferometric reflection. Data is stored in a compact disk by embossing, which forms a step or a pit in a plastic layer on the disk. The step or pit is formed to a depth equal to one fourth the wavelength of the light which is to be used in reading the disk. During reading of the data, a laser beam illuminates an area that includes both the step or pit and an additional area around it equal to that of the step or pit. Light which is reflected from the pit will be 180 degrees out of phase with respect to light reflected from the surrounding area. The interference between these reflections causes the net optical power reflected from that area of the disk to be near zero. In contrast, the absence of a pit in a region being viewed by the detector will produce a significant non-zero optical signal, since all of the light reflected will be in phase. Information can thus be stored in binary format on such a disk by designating either the presence or the absence of a pit as a binary "1", while the other state is designated as a binary "0".

An encoder plate for use in the optical encoder of the present invention may be fabricated, for example, from glass, as is commonly done for compact disks, with the encoding accomplished by an overlayer of plastic in which the coding pits are embossed from a master die. The plastic may then be covered by a high reflectance metal layer, typically aluminum or gold.

Figure 1:
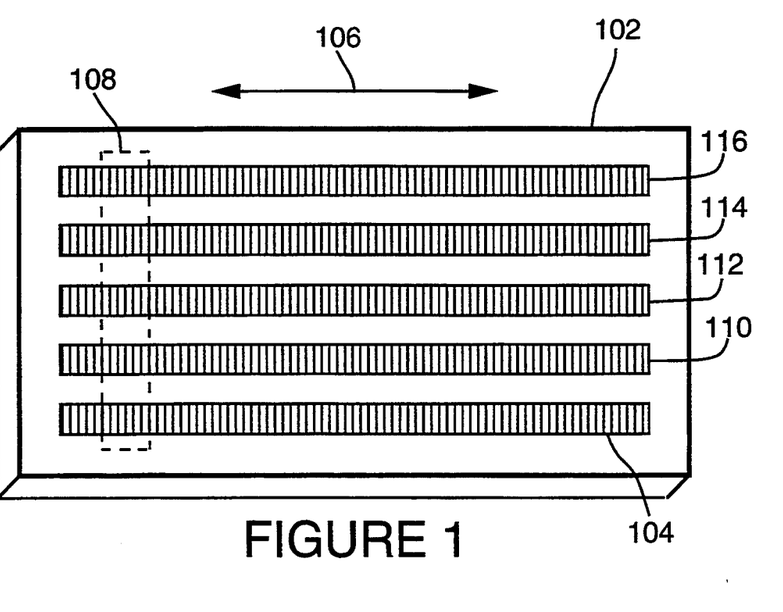
FIG. 1 is a plan view of an optical encoder disk constructed according to the present invention.

A rectangular plate, utilizing state of the art compact disk construction and having dimensions of approximately 25 mm × 1,000 mm (or larger), can be employed satisfactorily as a position encoder to give the necessary resolution. One embodiment of such a plate, referred to hereinafter as an encoder plate, is shown in plan view in FIG. 1 as plate 102, which is movable in a linear direction indicated by the arrow 106. The plate is provided with a linear absolute track 104 parallel to the direction 106. A number of uniformly sized sectors, such as the sector 108, are designated for the surface of the plate 102. The plate might, for example, be divided into 1,000 such sectors. The choice of the total number of sectors is based upon the limitations imposed by the dimensions of the encoder plate, coupled with the physical dimensions of the pits used in compact disk technology. Larger encoder plates could be divided into more sectors, while smaller plates would require fewer divisions. The plate also includes linear first, second, third, and fourth incremental tracks 110, 112, 114, and 116 defined on the surface parallel to the direction 106.

Figure 2:
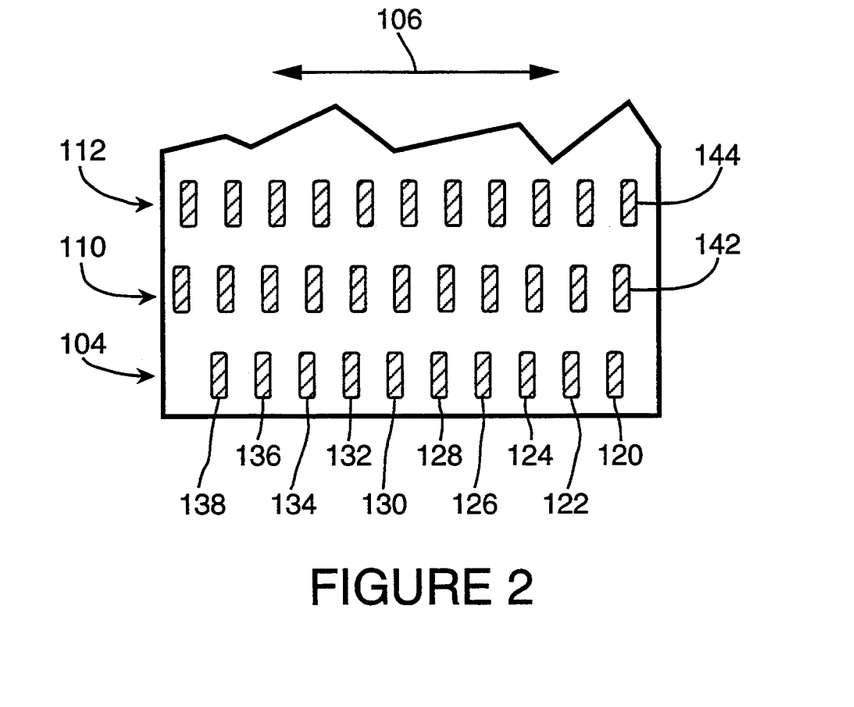
FIG. 2 is an expanded view of a portion of the encoder disk of FIG. 1 illustrating the format of the digital and analog tracks on the surface of the disk.

FIG. 2 is an expanded view of FIG. 1 illustrating a portion of one sector. Within the absolute track 104, a series of digital bits are formed on the surface of the plate in sequence along the track within each sector. Each such bit is optically readable as a binary 1 or a binary 0, and each series of the bits within a sector defines a binary word. In the sector shown, for example, are ten digital bits 120-138. Each such bit also corresponds to a step or pit as referred to above, wherein "dark" bits, such as the bits 120, 122, 126, 128, 134, and 138, correspond to locations where pits produce out of phase light which interferes with light reflected from the surrounding area, producing a minimum of reflected optical energy. "Bright" bits, such as the bits 124, 130, 132, and 136, correspond to locations where there is no pit, so that a maximum amount of optical energy is reflected from these areas. As stated above, the bit "sense" could equally well be reversed, with reflected optical energy indicative of either a logical "one" bit or a logical "zero" bit.

In FIG. 2, note that there are ten bits within the digital word contained in the sector. The first two bits 120 and 122 are utilized for a start symbol, leaving eight bits with which position information may be encoded.

The repeat distance between stripes and, therefore, sector size is determined by the convenience of choice of incremental resolution desired and the limitations of optics. Suppose, for example, that the desired linear resolution is 2.54 micrometers (0.0001 inch), A convenient stripe width would be 5.08 micrometers. This width would then dictate that the optical spot size be 12.9 microns, in order that optical interference occur as the optical beam overlaps the stripe. It can be shown that optical spot sizes as small as 10 micrometers in diameter can be produced using optical fibers and appropriate lens optics. The repeat distance from stripe to stripe would be $8 \times 2.54 = 20.32$ micrometers, or 49,921 stripes per meter. Four adjacent rows of such stripes each successively shifted by 2.54 micrometers (i.e., in four-phase quadrature), would yield 393,700 counts per meter, or 10,000 counts per inch. In this embodiment, the stripe width and spacing have been chosen to conveniently measure distance in English units.

There is some liberty with respect to choosing the size of the sector in the absolute track. A ten digit base five encoding system contains 1,954 permissible numbers, which can be used to uniquely label a sector. With a stripe pitch of 20.32 micrometers, use of all available codes permits unique sector position identification in a length of 0.397053 meters, or 15.632 inches. Use of fewer than the total 1,954 unique numbers is permissible, if the desired measurable total length is smaller. One may increase this length by increasing the number of digits in each sector of the data track and, therefore, the length of each sector. There may be fewer sectors per unit distance, but the resolution is not changed, having been determined by the stripe width and pitch.

In addition to the absolute track 104, the first incremental track 110 and the second incremental track 112 are depicted in FIG. 2. The first track contains a first series of optically detectable marks, such as the mark 142, which are evenly spaced around the track. The absolute track 104 and the first incremental track 110 provide incremental position information relative to the last sector word that was read, in addition to indicating the direction of linear displacement. Absolute position is therefore provided by first identifying the digital word in the last digital code segment read, which indicates the position of the corresponding linear sector. By counting the analog marks in the track 110, the incremental distance relative to the start of the sector can be determined to deduce the absolute position of the encoder. If, for example, ten analog marks were used in each sector, this combination of a absolute track and a single incremental track would yield an accuracy of one part in 2,500/inch.

Figure 3:
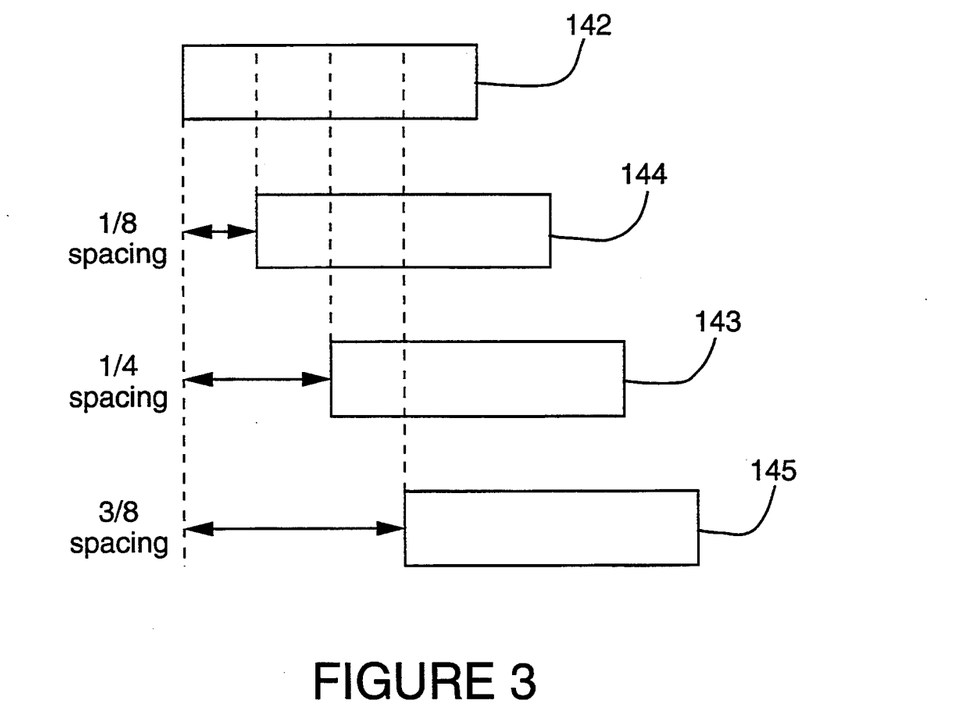
FIG. 3 is a diagram schematically illustrating the relative positions of the four analog tracks in the five track embodiment of the optical encoder disk shown in FIG. 1.

As mentioned above, four incremental tracks 110–116 are provided in the preferred embodiment. The second incremental track 112, which is also shown in the expanded view of FIG. 2, includes a second series of marks, such as the mark 144, which are evenly spaced around the track. The number of marks in the second series is equal to that in the first series. Moreover, the marks in the second series are displaced in the direction 106 with respect to corresponding marks in the first series by an linear amount equal to one eighth the spacing of the marks in the first series. Similarly, the third and fourth incremental tracks 114 and 116 contain a third and a fourth series of marks, each of which also includes the same number of marks as in the first series. The marks in the third series, however, are displaced in the direction 106 with respect to a corresponding mark in the first series by an linear amount equal to one fourth the spacing of the marks in the first series, while the marks in the fourth series are displaced in the direction 106 with respect to a corresponding mark in the first series by an linear amount equal to three eighths the spacing of the marks in the first series. FIG. 3 is a diagram schematically illustrating the relative positions of the marks in the four incremental tracks 110, 112, 114, and 116 in the five track embodiment of the optical encoder plate shown in FIG. 1, with marks 142, 144, 143, and 145 depicted for tracks 110, 112, 114, and 116, respectively.

One particular embodiment of the first absolute track involves an implementation using a base 5 numbering system to indicate the absolute position and the direction of rotation of the plate. The start symbol and encoded number for the first 20 and last 20 sectors of an exemplary base 5 encoding scheme are depicted schematically in FIG. 4. The technique for accomplishing this requires two or more tracks of data, i.e., one absolute track and one or more incremental tracks, with N tracks implying the use of a base N number system. The absolute position data must be readable for either direction of rotation and must include a unique "start symbol" to unambiguously determine the starting point of the digital information recorded on the absolute track in each sector.

Each sector has a unique base five value. The unique numbers are ultimately translated to base 2, where ten bits are required to distinguish among up to 1,024 sectors, and 11 bits are required to distinguish among up to 2,048 sectors. A "start symbol" is required at the start and end of each number to unambiguously read the code value. The start symbol must be unique when read forward or backward in the linear embodiment. Use of the CD technology imposes certain constraints. Because a quarter-wave pit is used to reflect half the spot size back out of phase, resulting in an optical null, all marks must have the same width. Furthermore, because of size constraints limiting the number of marks which can be placed within each sector in the absolute track, a strictly binary encoding scheme may not be possible. Consequently, in order to pack the data more efficiently and simplify the decoding electronics, a base 5 number system is used. The symbol '0' is represented by a missing mark, symbol '1' by a mark which is aligned with the marks in the first incremental track (shown in FIG. 4 as a cross-hatched rectangle in the leftmost position within a digit column), '2' by a mark which is aligned with the marks in the second incremental track (in FIG. 4, a rectangle shifted one position to the right within a digit column with respect to the position of a '1' symbol), '3' by a mark which is aligned with the marks in the third incremental track (in FIG. 4, a rectangle shifted two positions to the right within a digit column with respect to the position of a '1' symbol), and '4' by a mark which is aligned with the marks in the fourth incremental track (in FIG. 4, a rectangle shifted three position to the right within a digit column with respect to the position of a '1' symbol).

Figure 4:
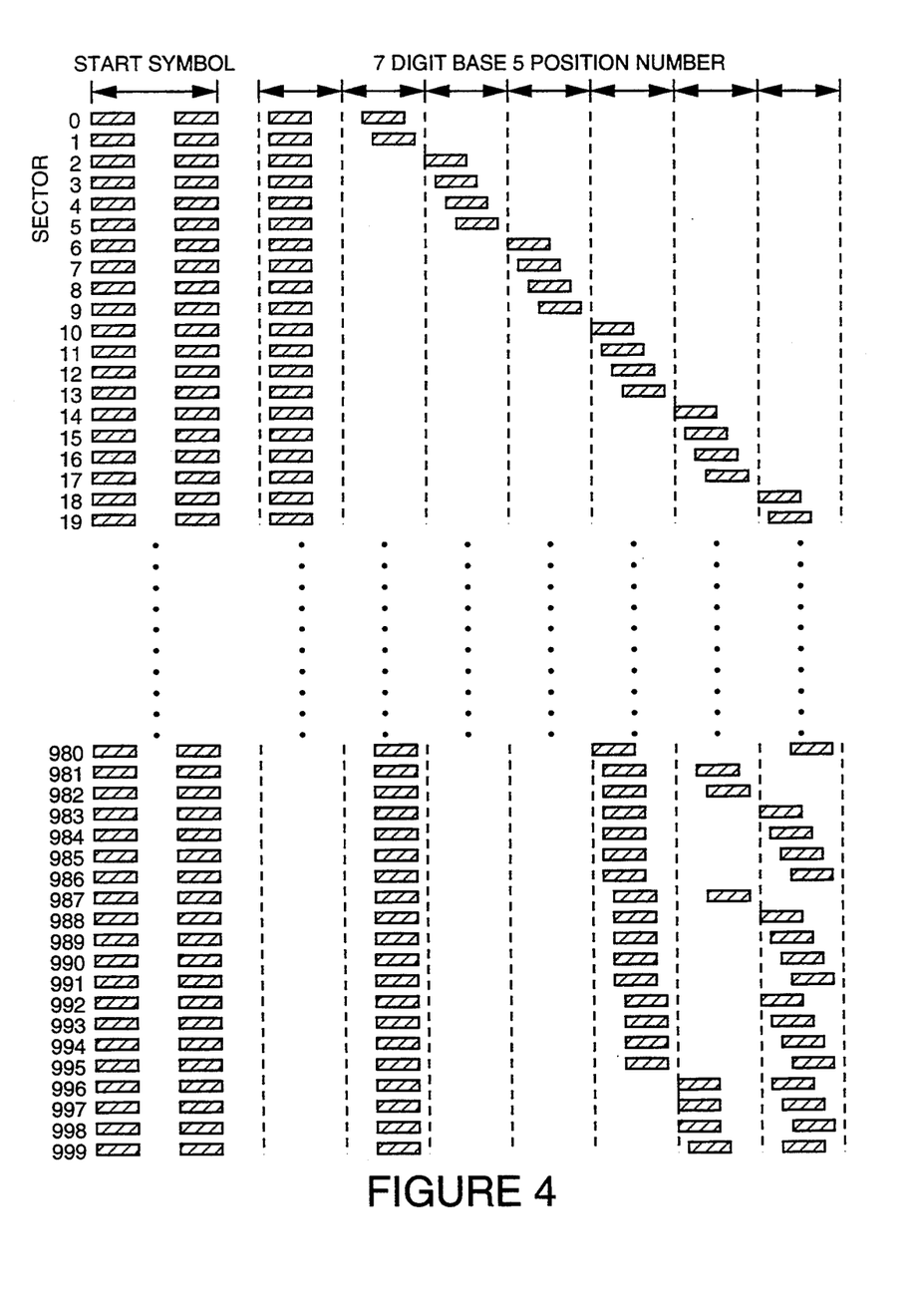
FIG. 4 schematically depicts the start symbol and encoded number for the first 20 and last 20 sectors of an exemplary base 5 encoding scheme.

The sequence '11' (in FIG. 4, represented in each sector row by the left two cross-hatched rectangular marks) is designated as the start symbol. Seven of the remaining base 5 marks in each sector are then used to encode 1,000 unique numbers. The CD technology, however, imposes an additional constraint, which permits no two marks to be closer than the minimum spacing. This prevents, for example, a '5' being followed by a '1' (there is some flexibility in this limitation, depending on the length chosen for each mark and the number of tracks employed). Furthermore, the start symbol '11' may never occur in any number, to avoid confusion with the start symbol. Assuming a conservative constraint that none of the symbols in the set {1,2,3,4 } can be followed by a smaller digit except 0, there are 1,954 numbers remaining that can be represented in seven digits base 5. In this implementation, as will readily be understood by those skilled in the art, a set of adders and an EPROM can be utilized to convert the base 5 number to a binary (base 2) number.

A set of numbers for a particular embodiment of this coding scheme, as illustrated by the coding for the first 20 and last 20 sectors in FIG. 3, can be readily generated by one skilled in the art using the requirements and limitations discussed above.

When the information available from the second incremental track is combined with that from the absolute track and the first incremental track, the achievable resolution in the exemplary embodiment is doubled to one part in 20,000. Moreover, since the two series of marks 142 and 144 in the two incremental tracks are 90° out of phase, quadrature interpolation can be utilized to further increase the resolution to one part in 40,000. Such quadrature interpolation requires only four additional bits of accuracy and is therefore easily realizable using an ordinary microprocessor or logic circuit.

With the addition of the third and fourth incremental tracks 114 and 116, a mark is provided for each 45° of phase change in the incremental series. This is equivalent (in an embodiment having ten marks per incremental track per sector) to providing forty analog marks per linear sector. The raw resolution with the additional information provided by the employment of the four incremental tracks 110–116 is increased to one part in 40,000. Again, digital interpolation of the raw information can be accomplished to yield a factor of four multiplication, resulting in an accuracy in the illustrative embodiment of one part in 160,000.

Each of the tracks, namely the absolute track 104 and the four incremental tracks 110–116, requires a channel for optical addressing. The optical channels associated with the four incremental tracks in essence require only four additional bits for the final accuracy figure. Encoding is therefore accomplished with one track, the absolute track 104, for an absolute digital resolution of 1,000 parts per revolution, while one, two, or four incremental tracks provide incremental position information relative to the last sector position and four bit digital interpolation of the incremental tracks provides the final resolving power.

Within the industrial environment in which encoders frequently must operate, there are several practical problems which must be addressed. Typically, the member on which the encoder plate is mounted will not consistently slide within a fixed plane of movement. Such deviations from in-plane motion are known as "wobble", which interferes with the ability to read the encoder plate consistently and accurately. Wobble may develop for a variety of reasons, such as temperature changes in the machine driving the encoder plate or degradation of the attachment between the encoder plate and the device whose linear position is to be measured. Furthermore, when elevated temperatures are present in the machinery to be measured, the heat can degrade the electronics associated with commonly available encoders. Heat damage is especially likely when a metal part is utilized to transmit linear displacement to the encoder device, since the metal part will act as an efficient conductor of heat.

Figure 5:
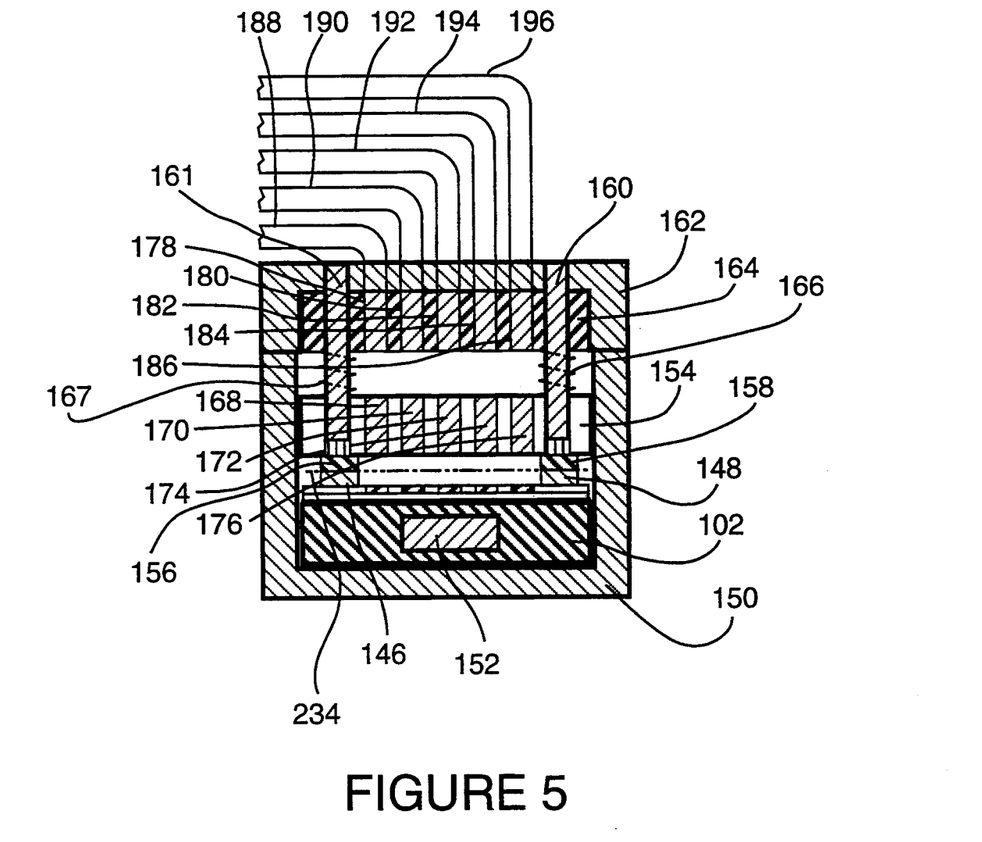
FIG. 5 illustrates in cross sectional side view an encoder assembly housing the encoder disk shown in FIGS. 1-2.

In accord with the device and method of the present invention, these limitations arising from wobble and heat sensitivity can be ameliorated or eliminated from the encoding function. FIG. 5 is a cross sectional view of an encoder assembly using the sliding encoder plate of FIGS. 1 and 2. Here, first and second linear low friction coatings 146 and 148 have been applied to the surface of the encoder plate 102. A housing 150 encases the encoder and provides other structure necessary to allow linear displacement to be accurately determined despite wobble and despite a thermally harsh operating environment. The housing 150 contains an aperture at one end for admitting an encoder shaft 152 into the interior. The encoder shaft is attached to the encoder plate 102 so that both the encoder shaft and the encoder plate move together.

Opposing the encoder plate 102 is a read head plate 154. The read head plate 154 carries a pair of skids 156 and 158 which are preferably made of a fluorocarbon material or coated with a fluorocarbon coating such as Teflon ®. The skid 156 evenly opposes the low friction coating 146, while the skid 158 evenly opposes the low friction coating 148. The read head plate 154 is secured by shafts 160 and 161. A cover 162 is rigidly attached to the housing 150 and is removable from the housing to provide service and maintenance access thereto. The inside of the cover 162 is partially packed with a filler material 164 which serves to provide additional support for the shafts 160 and 161. The shafts are rigidly connected to the cover 162 and the read head plate 154 to prevent sideways movement of the read head plate.

Compression springs 166 and 167 surround the shafts 160 and 161 between the filler material 164 and the read head plate 154 to urge the read head plate toward the encoder plate 102. This biasing of the read head plate brings the skids 156 and 158 into direct sliding contact with the low friction coatings 146 and 148 on the encoder plate. Alternatively, the read head could be mounted on the back side of the encoder plate to simplify the design. In addition, the shape of the marks in the absolute and incremental tracks can be chosen to minimize the sensitivity of the design to in-plane wobble of the encoder plate.

A series of first collimating transfer optics 168, 170, 172, 174, and 176 are located in the read head plate 154. These elements are an array of optical fibers with appropriate focusing optics or alternatively are a series of gradient index (GRIN) lens rods. Each one of the first collimating transfer optics is positioned over a single track of the encoder plate 102. In the cover 162 and opposing the first collimating transfer optics is a set of second collimating transfer optics 178, 180, 182, 184, and 186 mounted within the filler material 164. Each element in the second collimating transfer optics is aligned with a corresponding element in the series of first collimating transfer optics. A series of five optical fibers 188, 190, 192, 194, and 196 extend from a distant point with respect to the encoder assembly to connect with corresponding elements in the second series of collimating transfer optics. In this manner, a single optic channel or connection is made between each fiber in the set of optical fibers 188–196 and thereby to each of the five tracks of the encoder plate 102, namely the absolute track 104 and the four incremental tracks 110, 112, 114, and 116. It may be desirable to provide an opaque mask 234 positioned close to the surface of the encoder plate. This mask contains openings which permit illumination of a precise area of the absolute track and the incremental tracks in order to ensure a more effective interferometric effect in the reading of dark bits.

Note the combination of clearances between the read head plate 154 and the filler material 164. The mechanical construction of the encoder assembly 150 enables the read head plate to follow the encoder plate in the event that the encoder plate develops wobble. The limited support which the read head plate receives allows any such wobble forces to be effectively transmitted into a following motion. As will be appreciated by those skilled in the art, if the depth of field of the optical elements 178–186 is sufficiently long, the read head plate 154 and its associated collimating optics 168–176 will not be required. Moreover, if the optical fibers 188–196 can be held in close proximity to the encoder plate 102, no focusing optical elements will be needed. In the latter implementation, however, precision alignment is required. This alignment may be provided, for example, by etched grooves in a silicon or other substrate, which can be accomplished by chemical or mechanical ruling or machining.

Figure 6:
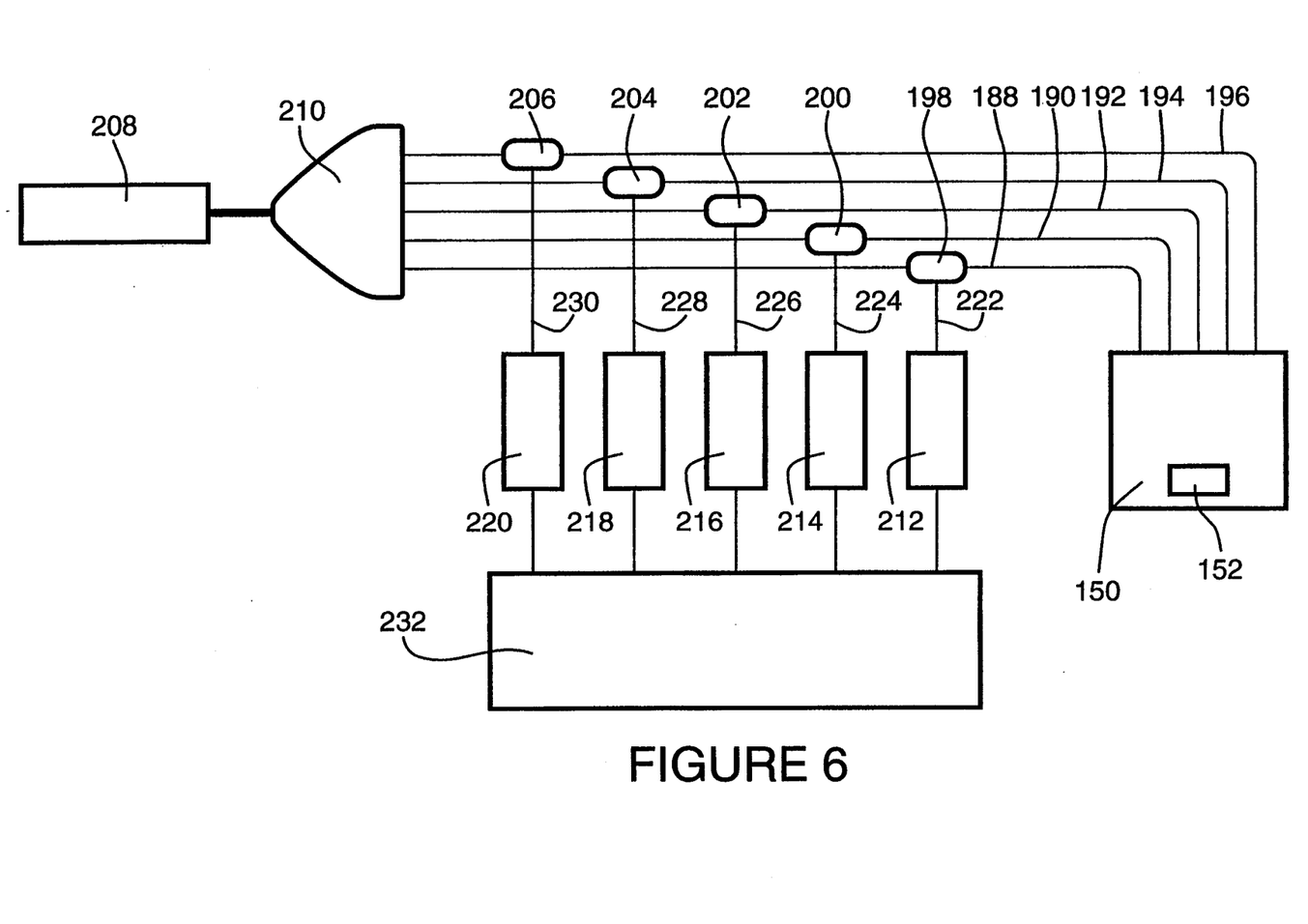
FIG. 6 is a schematic diagram of the encoder system of the present invention embodying the encoder assembly of FIG. 5.

Now referring to FIG. 6, a schematic diagram of the hybrid digital analog system of the present invention is shown incorporating the encoder assembly of FIG. 5. The set of optical fibers 188–196 shown in FIG. 5 extends from the encoder assembly 150 to a series of fiber optic couplers 198, 200, 202, 204, and 206. These fiber optic couplers are typically three port devices which allow light to be introduced into a first port for transmission out of a second port. Light returning to the second port is redirected to a third port. In this manner, a laser or other light source can be introduced at the first port to be routed through the second port to a remote location. Light returning to the second port is directed to the third port rather than back to the source, to better enable the returning light to be measured and detected without interference from the source.

Thus the first ports of the fiber optic couplers are connected to a light source in the form of a laser 208. A fanning or dispersion coupler 210 is utilized to couple light from the laser into each of the first ports of the fiber optic couplers 198–206. In this manner, a single laser is configured to supply light in the same manner as would five separate lasers. Those skilled in the art will appreciate that an optical isolator may be necessary to prevent feedback to the laser 208 and the resulting instability in the signal level. A light emitting diode or other incoherent light source would not require an isolator.

The third ports of the fiber optic couplers are each individually connected to a series of photosensitive detectors 212, 214, 216, 218, and 220 by means of a series of optical fibers 222, 224, 226, 228, and 230. The detectors convert the optical signals from the second ports of the fiber optic couplers into electrical signals. A signal processing and decoding device 232 is electrically connected to the detectors 212–220. The signal processing and decoding device is typically a computer, a microprocessor, or digital logic which is programmed to read, interpret, and output the digital signals it has received from the detectors. The second ports of the fiber optic couplers 198–206 are connected to the optical fibers 188–196 both to transmit light to, and receive digital signals from, the encoder assembly 150.

The optical coupling could also be achieved with an alternative arrangement which allows the three port fiber optic couplers to be eliminated and delivers the laser light to the encoder assembly through separate illumination fibers. The light reflected from the plate is collection in this scheme by a set of collection fibers which are directly connected to the detectors for each track. Depending on the application and the desired length of the fibers, this approach may provide a lower cost option by eliminating the fiber optic couplers.

Referring to FIGS. 4 and 5, the operation of the high resolution optical hybrid digital-analog position encoder of the present invention is as follows. Light from the laser 208 is directed into the fiber optic couplers 198–206. This light propagates from the second ports of the optic couplers along the optical fibers 188–196 and into the second collimating transfer optics 178–186, where the cross sectional area in which the light is propagating is somewhat expanded. This expansion of the cross sectional area facilitates the transmission and reduces the losses of the light as it propagates between the first collimating transfer optics 168–176 and the second collimating transfer optics 178–186. An expanded cross sectional area of light in this gap serves to mitigate the loss of light through any misalignment between the first and second collimating transfer optics due to displacement of the read head plate. The optical fibers 188–196 should preferably be single mode fiber to preserve the interferometric effect caused by reflection of light from the pits and the surrounding surface. Multimode fiber will scramble and degrade the interference signal over the length of the fiber.

The light propagates across the gap and into the first collimating transfer optics 168–176, from which it is positioned to focus upon the particular track on the encoder plate with which it is associated. Consequently, the first collimating transfer optics contain focusing optics on the side facing the encoder plate to efficiently direct light to the encoder plate and collect the reflected light. The second collimating transfer optics are designed to match the numerical aperture of the set of optical fibers 188–196. The first collimating transfer optics 168–176 act both to focus the downward traveling input beams on the encoder plate and to capture the beams reflecting from the surface of the encoder plate. The focal spot size on the encoder plate must be chosen for tolerance to fluctuations in the position of the encoder plate with respect to the read head plate and lateral tolerance due to shifts resulting from wobble.

The focusing function could also be accomplished by miniature binary optic lenses, by "lensing" the ends of rods, or by using gradient index (GRIN) lenses of the correct pitch to focus light on the encoder plate and collect the reflected signals. The latter approach is more forgiving of alignment tolerances for collecting the light reflected from the encoder plate and provides for communication of an expanded collimated beam between the read head plate and any such GRIN lenses in the first collimating transfer optics.

During linear displacement detection, the encoder shaft 152 moves along with the machinery to which it is connected, also moving the encoder plate 102. Reflections from the encoder plate occur in the manner as described above for the dark bits, bright bits, and analog marks on the encoder plate. Since the read head plate 154 is slidably engaged with the encoder plate, any wobbling of the encoder plate will cause congruent wobbling of the read head plate. Even if congruent wobbling occurs, the close contact of the read head plate against the encoder plate ensures uniformity of the gap between the encoder plate and the first collimating transfer optics 168–176. The uniformity of this gap ensures that the first collimating transfer optics will retain its focus upon each respective track of the encoder plate.

Light reflected from each of the tracks on the surface of the encoder plate is transmitted into the associated element of the first collimating transfer optics and thence to the second collimating transfer optics 178–186. Light from the second collimating transfer optics is impedance matched into the optical fibers 188–196. Again, the information from each track is kept segregated from the information in the other tracks, as each track of information is guided into an associated single optical fiber. Light propagated through the optical fibers is routed from the second to the third ports of the couplers 198–206 and into the detectors 212–220, where the optical signals are converted to digital electrical signals. The digital electrical signals are then directed into the signal processing and decoding device 232 for further treatment. The signal processing and decoding device is not required to be an unusually high speed device. Consider an encoder head in motion at 1 meter per second. Assuming a pitch of 20.32 micrometers, there would be 492.1 marks per centimeter (1,250 marks per inch), and 49,921 marks per meter. The data rate is then 49.921 kilobits/sec per meter/sec of speed. Taking into account a rising and falling signal edge for each mark, and four incremental channels in quadrature, the data rate per channel is less than 100 kilobits/sec per meter/sec, and the total bit count for all four channels is less than 400 kilobits/sec per meter/second velocity. Thus, even at high linear encoder speeds, the data bit rates are easily accommodated within the range of conventional computing systems.

It is to be understood that the individual optical fibers 188–196 and individual fiber optic couplers 198–206 can be replaced by a single fiber used in conjunction with a series of wavelength division multiplex couplers. The use of wavelength division multiplex couplers would require that each track of the encoder plate operate on a separate wavelength. This would complicate the design somewhat, but would facilitate the use of a single fiber in place of multiple optical fibers.

The preferred embodiments of this invention have been illustrated and described above. Modifications and additional embodiments, however, will undoubtedly be apparent to those skilled in the art. Changes in the materials, orientation, method of manufacture, and other characteristics and design parameters, for example, are contemplated to be within the spirit and scope of the claimed invention. Furthermore, equivalent elements may be substituted for those illustrated and described herein, parts or connections might be reversed or otherwise interchanged, and certain features of the invention may be utilized independently of other features. The absolute track encoding technique, for example, can also be applied where different numbers of incremental tracks are employed. Of special interest are the cases of two tracks, where the method is slightly modified, and three tracks, where conventional quadrature data can be concurrently implemented. There are cost savings to be had by minimizing the number of tracks, while performance is improved by increasing the number of tracks. In the three track implementation, the two inner tracks are conventional, with a standard 90 degree quadrature. The outer track in such an embodiment can use base 3 numbering, implemented identically to that described in the five track case but with a packing density higher than that which could be achieved with a binary or grey-code scheme. The use of two tracks represents substantial cost reduction. In this case, the encoding scheme reduces to base 2 and there is no start symbol. In this implementation, however, no quadrature is available to determine direction. A slight modification of this scheme can provide adequate performance. The start symbol can be encoded as a track in phase with the incremental track. All other bits are then encoded at a 90 degree phase shift with respect to the incremental track. This design will allow the direction in which the encoder plate is moving to be determined on any digit but the start symbol, while only two bits are lost in the data track. Consequently, the exemplary embodiments should be considered illustrative, rather than inclusive, while the appended claims are more indicative of the full scope of the invention.

We claim:

1. An interferometrically readable optical encoder for sensing linear position, comprising:
   an optical medium movable in a linear direction and having a data storage layer, a plurality of uniformly sized sectors being defined in the layer;
   a linear absolute track defined in the layer parallel to the linear direction;
   a plurality of absolute marks formed in the layer in sequence along the absolute track within each sector, each such absolute mark being detectable by interferometric reflection of coherent light as representative of a binary 1 or a binary 0 and each such plurality of absolute marks defining a binary word;
   a first linear incremental track defined in the layer parallel to the linear direction; and
   a first series of incremental marks formed in the layer and evenly spaced along the first incremental track, each such incremental mark being detectable by interferometric reflection of coherent light,
   whereby the binary word in a sector can be read to identify the position of that sector in the linear direction and thereby indicate the approximate position of the medium, and
   whereby the first series of incremental marks can be detected to refine the approximate position indication and thereby indicate a more precise position of the medium.

2. The optical encoder of claim 1, wherein the linear absolute track further comprises:
   at least one start mark formed in the absolute track within each sector and having a common value in all sectors to indicate the start of a sector; and
   wherein the binary word within each sector has a unique value identifying the sector.

3. The optical encoder of claim 1, further comprising:
   a second linear incremental track defined in the layer parallel to the linear direction;
   a second series of incremental marks formed in the layer and evenly spaced along the second incremental track, each such incremental mark being detectable by interferometric reflection of coherent light, the number of marks in the second series being equal to the number of marks in the first series and each mark within the second series being displaced in the linear direction with respect to a corresponding mark in the first series by an amount equal to one eighth the spacing of the marks in the first series,
   whereby the second series of marks can be detected to, in conjunction with the first series of marks, refine the approximate position indication.

4. The optical encoder of claim 3, wherein the linear absolute track further comprises:
   at least one start mark formed in the absolute track within each sector and having a common value in all sectors to indicate the start of a sector; and
   wherein the binary word within each sector further comprises a base 3 word having a unique value identifying the sector, each binary digit of the word being encoded in base 3 by means of its alignment with a mark in the first incremental track or a mark in the second incremental track.

5. The optical encoder of claim 3, further comprising:
   a third linear incremental track defined in the layer parallel to the linear direction;
   a third series of incremental marks formed in the layer and evenly spaced along the third incremental track, each such incremental mark being detectable by interferometric reflection of coherent light, the number of marks in the third series being equal to the number of marks in the first series and each mark within the third series being displaced in the linear direction with respect to a corresponding mark in the first series by an amount equal to one fourth the spacing of the marks in the first series;
   a fourth linear incremental track defined in the layer parallel to the linear direction; and
   a fourth series of incremental marks formed in the layer and evenly spaced along the fourth incremental track, each such incremental mark being detectable by interferometric reflection of coherent light, the number of marks in the fourth series being equal to the number of marks in the first series and each mark within the fourth series being displaced in the linear direction with respect to a corresponding mark in the first series by an amount equal to three eighths the spacing of the marks in the first series,
   whereby the third and fourth series of marks can be mad to, in conjunction with the first and second series of marks, refine the approximate position indication.

6. The optical encoder of claim 5, wherein the linear absolute track further comprises:
   at least one start mark formed in the absolute track within each sector and having a common value in all sectors to indicate the start of a sector; and
   wherein the binary word within each sector further comprises a base 5 word having a unique value identifying the sector, each binary digit of the word being encoded in base 5 by means of its alignment with a mark in the first incremental track, a mark in the second incremental track, a mark in the third incremental track, or a mark in the fourth incremental track.

7. The optical encoder of claim 1, further comprising:
   a source of coherent light for illuminating the layer at a fixed position;
   an absolute track detector for detecting the portion of the illumination reflected from the marks within the absolute track;
   a first incremental track detector for detecting the portion of the illumination reflected from the marks within the first incremental track; and
   signal processing and decoding means for converting the output of the absolute track detector into a binary word and for interpolating the precise position of the medium from the output of the first incremental track detector.

8. The optical encoder of claim 7, further comprising:
   an opaque mask positioned between the light source and the optical medium and proximate to the layer;
   an absolute track opening in the mask for permitting illumination of a precise area of the absolute track; and
   a first incremental track opening in the mask for permitting illumination of a precise area of the first incremental track.

9. The optical encoder of claim 7, further comprising:
   a read head slidably engaging the optical medium;
   an absolute track optical collimator affixed to the read head for conveying light from the source of light to the absolute track and for conveying light reflected from the absolute track to the absolute track detector;
   an absolute track optical coupler connected between the source of light, the absolute track optical collimator, and the absolute track detector;
   an absolute track optical fiber coupling the absolute track optical coupler to the absolute track optical collimator;
   a first incremental track optical collimator affixed to the read head for conveying light from the source of light to the first incremental track and for conveying light reflected from the first incremental track to the first incremental track detector;
   a first incremental track optical coupler connected between the source of light, the first incremental track optical collimator, and the first incremental track detector; and
   a first incremental track optical fiber coupling the first incremental track optical coupler to the first incremental track optical collimator.

10. An interferometrically readable optical encoder for sensing linear position, comprising:
    an optical medium movable in a linear direction and having a data storage layer, a plurality of uniformly sized sectors being defined in the layer;
    a linear absolute track defined in the layer parallel to the linear direction;
    a plurality of absolute marks formed in the layer in sequence along the absolute track within each sector, each such absolute mark being detectable by interferometric reflection of coherent light as representative of a binary 1 or a binary 0 and each Such plurality of absolute marks defining a binary word;
    a first linear incremental track defined in the layer parallel to the linear direction;
    a first series of incremental marks formed in the layer and evenly spaced along the first incremental track;
    a second linear incremental track defined in the layer parallel to the linear direction;
    a second series of incremental marks formed in the layer and evenly spaced along the second incremental track, each such incremental mark being detectable by interferometric reflection of coherent light, the number of marks in the second series being equal to the number of marks in the first series and each mark within the second series being displaced in the linear direction with respect to a corresponding mark in the first series by an amount equal to one eighth the spacing of the marks in the first series;
    a third linear incremental track defined in the layer parallel to the linear direction;

a third series of incremental marks formed in the layer and evenly spaced along the third incremental track, each such incremental mark being detectable by interferometric reflection of coherent light, the number of marks in the third series being equal to the number of marks in the first series and each mark within the third series being displaced in the linear direction with respect to a corresponding mark in the first series by an amount equal to one fourth the spacing of the marks in the first series;

a fourth linear incremental track defined in the layer parallel to the linear direction; and a fourth series of incremental marks formed in the layer and evenly spaced along the fourth incremental track, each such incremental mark being detectable by interferometric reflection of coherent light, the number of marks in the fourth series being equal to the number of marks in the first series and each mark within the fourth series being displaced in the linear direction with respect to a corresponding mark in the first series by an amount equal to three eighths the spacing of the marks in the first series, whereby the binary word in a sector can be read to identify the position of that sector in the linear direction and thereby indicate the approximate position of the medium, and whereby the first, second, third, and fourth series of incremental marks can be detected to refine the approximate position indication and thereby indicate a more precise position of the medium.

11. The optical encoder of claim 10, wherein the linear absolute track further comprises:

at least one start mark formed in the absolute track within each sector and having a common value in all sectors to indicate the start of a sector; and wherein the binary word within each sector further comprises a base 5 word having a unique value identifying the sector, each binary digit of the word being encoded in base 5 by means of its alignment with a mark in the first incremental track, a mark in the second incremental track, a mark in the third incremental track, or a mark in the fourth incremental track.

12. An interferometrically readable optical encoder for sensing linear position, comprising:

an optical medium movable in a linear direction and having a data storage layer, a plurality of uniformly sized sectors being defined in the layer;

a linear absolute track defined in the layer parallel to the linear direction;

a plurality of absolute marks formed in the layer in sequence along the absolute track within each sector, each such absolute mark being detectable by interferometric reflection of coherent light as representative of a binary 1 or a binary 0 and each such plurality of absolute marks defining a binary word;

N-1 linear incremental tracks defined in the layer parallel to the linear direction, where N is an integer equal to or greater than 2;

N-1 series of incremental marks formed in the layer, the marks in each series being evenly spaced along the corresponding incremental track, each such incremental mark being detectable by interferometric reflection; of coherent light, the number of marks in each series being equal and being displaced in the linear direction with respect to corresponding marks in the other series so that the marks in the N-1 series occupy equally spaced unique positions of the medium;

whereby the binary word in a sector can be read to identify the position of that sector in the linear direction and thereby indicate the approximate position of the medium, and whereby the N-1 series of incremental marks can be detected to refine the approximate position indication and thereby indicate a more precise position of the medium.

13. The optical encoder of claim 12, wherein the linear absolute track further comprises:

at least one start mark formed in the absolute track within each sector and having a common value in all sectors to indicate the start of a sector; and wherein the binary word within each sector further comprises a base N word having a unique value identifying the sector, each binary digit of the word being encoded in base N according to its alignment with a mark in one of the N-1 series.

14. An interferometrically readable optical encoder for sensing linear position, comprising:

an optical medium movable in a linear direction and having a data storage layer, a plurality of uniformly sized sectors being defined in the layer;

a linear absolute track defined in the layer parallel to the linear direction;

a plurality of absolute marks formed in the layer in sequence along the absolute track within each sector, each such absolute mark being detectable by interferometric reflection of coherent light as representative of a binary 1 or a binary 0 and each such plurality of absolute marks defining a binary word;

a first linear incremental track defined in the layer parallel to the linear direction;

a first series of incremental marks formed in the layer and evenly spaced along the first incremental track;

a source of coherent light for illuminating the layer at a fixed position;

an absolute track detector for detecting the portion of the illumination reflected from the marks within the absolute track;

a first incremental track detector for detecting the portion of the illumination reflected from the marks within the first incremental track; and signal processing and decoding means for converting the ,output of the absolute track detector into a binary word to identify the position of that sector in the linear direction and thereby indicate the approximate position of the medium and for interpolating from the output of the first incremental track detector a more precise position of the medium.

15. The optical encoder of claim 14, further comprising:

an absolute track optical coupler for receiving light from the light source;

a first incremental track optical coupler for receiving light from the light source;

an input absolute track optical fiber connected between the absolute track optical coupler and proximate the layer of the medium for illuminating the absolute track;

a first input incremental track optical fiber connected between the first incremental track optical coupler and proximate the layer for illuminating the first incremental track;

an output absolute track optical fiber connected between the absolute track optical coupler and the absolute track detector for conveying reflected light from the absolute track to the absolute track detector; and a first output incremental track optical fiber connected between the first incremental track optical coupler and the first incremental track detector for conveying reflected light from the first incremental track to the first incremental track detector.

16. An interferometric method of sensing linear position, comprising the steps of:

providing an optical medium movable in a linear direction and having a data storage layer;

defining a plurality of uniformly sized sectors in the layer;

defining a linear absolute track in the layer parallel to the linear direction;

forming a plurality of absolute marks in the layer in sequence along the absolute track within each sector, each such absolute mark being detectable by interferometric reflection of coherent light as representative of a binary 1 or a binary 0 and each such plurality of absolute marks defining a binary word;

defining a first linear incremental track in the layer parallel to the linear direction;

forming a first series of incremental marks in the layer and evenly spaced along the first incremental track, each such incremental mark being detectable by interferometric reflection of coherent light;

reading the binary word in a sector to identify the position of that sector in the linear direction and thereby indicate the approximate position of the medium; and detecting the first series of incremental marks to refine the approximate position indication and thereby indicate a more precise position for the medium.

17. The method of claim 16, wherein the step of forming a plurality of absolute marks in sequence along the absolute track further comprises the steps of:

forming at least one start mark in the absolute track within each sector, the start mark having a common value in all sectors to indicate the start of a sector, the binary word within each sector having a unique value identifying the sector.

18. The method of claim 16, further comprising the steps of:

defining a second linear incremental track in the layer parallel to the linear direction;

forming a second series of incremental marks in the layer and evenly spaced along the second incremental track, each such incremental mark being detectable by interferometric reflection of coherent light, the number of marks in the second series being equal to the number of marks in the first series and each mark within the second series being displaced in the linear direction with respect to a corresponding mark in the first series by an amount equal to one eighth the spacing of the marks in the first series; and detecting the second series of incremental marks to, in conjunction with the first series of incremental marks, refine the approximate position indication.

19. The method of claim 18, wherein the step of forming a plurality of absolute marks in sequence along the absolute track further comprises the steps of:

forming at least one start mark in the absolute track within each sector, the start mark having a common value in all sectors to indicate the start of a sector, the binary word within each sector further comprising a base 3 word having a unique value identifying the sector, each binary digit of the word being encoded in base 3 by means of its alignment with a mark in the first incremental track or a mark in the second incremental track.

20. The method of claim 18, further comprising the steps of:

defining a third linear incremental track in the layer parallel to the linear direction;

forming a third series of incremental marks in the layer and evenly spaced along the third incremental track, each such incremental mark being detectable by interferometric reflection of coherent light, the number of marks in the third series being equal to the number of marks in the first series and each mark within the third series being displaced in the linear direction with respect to a corresponding mark in the first series by an amount equal to one fourth the spacing of the marks in the first series;

defining a fourth linear incremental track in the layer parallel to the linear direction;

forming a fourth series of incremental marks in the layer and evenly spaced along the fourth incremental track, each such incremental mark being detectable by interferometric reflection of coherent light, the number of marks in the fourth series being equal to the number of marks in the first series and each mark within the fourth series being displaced in the linear direction with respect to a corresponding mark in the first series by an amount equal to three eighths the spacing of the marks in the first series; and reading the third and fourth series of marks to, in conjunction with the first and second series of marks, refine the approximate position indication.

21. The method of claim 20, wherein the step of forming a plurality of absolute marks in sequence along the absolute track further comprises the steps of:

forming at least one start mark in the absolute track within each sector, the start mark having a common value in all sectors to indicate the start of a sector, the binary word within each sector further comprising a base 5 word having a unique value identifying the sector, each binary digit of the word being encoded in base 5 by means of its alignment with a mark in the first incremental track, a mark in the second incremental track, a mark in the third incremental track, or a mark in the fourth incremental track.

22. The method of claim 16, further comprising the steps of:

providing a source of coherent light for illuminating the layer at a fixed position;

detecting the portion of the illumination reflected from the marks within the absolute track;

detecting the portion of the illumination reflected from the marks within the first incremental track;

converting the output of the absolute track detector into a binary word; and interpolating the precise position of the medium from the output of the first incremental track detector.

23. The method of claim 22, further comprising the steps of: positioning an opaque mask between the light source and the optical medium and proximate to the layer;

provjding an absolute track opening in the mask to illuminate a precise area of the absolute track; and providing a first incremental track opening in the mask to illuminate a precise area of the first incremental track.

24. The method of claim 22, further comprising the steps of:

providing a read head slidably engaging the optical medium;

affixing an absolute track optical collimator to the read head for conveying light from the source of light to the absolute track and for conveying light reflected from the absolute track to the absolute track detector;

connecting an absolute track optical coupler between the source of light, the absolute track optical collimator, and the absolute track detector;

coupling the absolute track optical coupler to the absolute track optical collimator with an absolute track optical fiber;

affixing a first incremental track optical collimator to the read head for conveying light from the source of light to the first incremental track and for conveying light reflected from the first incremental track to the first incremental track detector;

connecting a first incremental track optical coupler between the source of light, the first incremental track optical collimator, and the first incremental track detector; and coupling the first incremental track optical coupler to the first incremental track optical collimator with a first incremental track optical fiber.

25. An interferometric method of sensing linear position, comprising the steps of:

providing an optical medium movable in a linear direction and having a data storage layer;

defining a plurality of uniformly sized sectors in the layer;

defining in the layer a linear absolute track parallel to the linear direction;

forming a plurality of absolute marks in the layer in sequence along the absolute track within each sector, each such absolute mark being detectable by interferometric reflection of coherent light as representative of a binary 1 or a binary 0 and each such plurality of absolute marks defining a binary word;

defining in the layer a first linear incremental track parallel to the linear direction;

forming a first series of incremental marks in the layer and evenly spaced along the first incremental track;

defining in the layer a second linear incremental track parallel to the linear direction;

forming a second series of incremental marks in the layer and evenly spaced along the second incremental track, each such incremental mark being detectable by interferometric reflection of coherent light, the number of marks in the second series being equal to the number of marks in the first series and each mark within the second series being displaced in the linear direction with respect to a corresponding mark in the first series by an amount equal to one eighth the spacing of the marks in the first series;

defining in the layer a third linear incremental track parallel to the linear direction;

forming a third series of incremental marks in the layer and evenly spaced along the third incremental track, each such incremental mark being detectable by interferometric reflection of coherent light, the number of marks in the third series being equal to the number of marks in the first series and each mark within the third series being displaced in the linear direction with respect to a corresponding mark in the first series by an amount equal to one fourth the spacing of the marks in the first series;

defining in the layer a fourth linear incremental track parallel to the linear direction;

forming a fourth series of incremental marks in the layer and evenly spaced along the fourth incremental track, each such incremental mark being detectable by interferometric reflection of coherent light, the number of marks in the fourth series being equal to the number of marks in the first series and each mark within the fourth series being displaced in the linear direction with respect to a corresponding mark in the first series by an amount equal to three eighths the spacing of the marks in the first series;

reading the binary word in a sector to identify the position of that sector in the linear direction and thereby indicate the approximate position of the medium; and detecting the first, second, third, and fourth series of marks to refine the approximate position indication and thereby indicate a more precise position for the medium.

26. The method of claim 25, wherein the step of forming a plurality of absolute marks in sequence along the absolute track further comprises the steps of:

forming at least one start mark in the absolute track within each sector, the start mark having a common value in all sectors to indicate the start of a sector, the binary word within each sector further comprising a base 5 word having a unique value identifying the sector, and each binary digit of the word being encoded in base 5 by means of its alignment with a mark in the first incremental track, a mark in the second incremental track, a mark in the third incremental track, or a mark in the fourth incremental track.

27. An interferometric method for sensing linear position, comprising the steps of:

providing an optical medium movable in a linear direction and having a data storage layer;

defining a plurality of uniformly sized sectors in the layer;

defining in the layer a linear absolute track parallel to the linear direction;

forming a plurality of absolute marks formed in the layer in sequence along the absolute track within each sector, each such absolute mark being detectable by interferometric reflection of coherent light as representative of a binary 1 or a binary 0 and each such plurality of absolute marks defining a binary word;

defining in the layer N-1 linear incremental tracks parallel to the linear direction, where N is an integer equal to or greater than 2;

forming N-1 series of incremental marks in the layer and evenly spaced along the corresponding incremental track, each such incremental mark being detectable by interferometric reflection of coherent light, the number of marks in each series being equal and being displaced in the linear direction with respect to corresponding marks in the other series so that the marks in the N-1 series occupy equally spaced unique positions of the medium;

reading the binary word in a sector to identify the position of that sector in the linear direction and thereby indicate the approximate position of the medium, and detecting the N-1 series of marks to refine the approximate position indication and thereby indicate a more precise position for the medium.

28. The method of claim 27, wherein the step of forming a plurality of absolute marks in sequence along the absolute track further comprises the steps of:

forming at least one start mark in the absolute track within each sector, the start mark having a common value in all sectors to indicate the start of a sector, the base N word within each sector having a unique value identifying the sector and each binary digit of the sector word being encoded in base N by means of its alignment with a mark in one of the N-1 series.

29. An interferometric method of sensing linear position, comprising the steps of:

providing an optical medium movable in a linear direction and having a data storage layer;

defining a plurality of uniformly sized sectors in the layer;

defining in the layer a linear absolute track parallel to the linear direction;

forming a plurality of absolute marks in the layer in sequence along the absolute track within each sector, each such absolute mark being detectable by interferometric reflection of coherent light as representative of a binary 1 or a binary 0 and each such plurality of absolute marks defining a binary word;

defining in the layer a first linear incremental track parallel to the linear direction; and forming a first series of incremental marks in the layer and evenly spaced along the first incremental track;

providing a source of coherent light for illuminating the layer at a fixed position;

detecting the portion of the illumination reflected from the marks within the absolute track;

converting the output of the absolute track detector into a binary word to identify the position of that sector in the linear direction and thereby indicate the approximate position of the medium;

detecting the portion of the illumination reflected from the marks within the first incremental track; and interpolating the precise position of the medium from the output of the first incremental track detector.

30. The method of claim 29, further comprising the steps of:

providing an absolute track optical coupler for receiving light from the light source;

providing a first incremental track optical coupler for receiving light from the light source;

connecting an input absolute track optical fiber between the absolute track optical coupler and proximate the layer of the medium for illuminating the absolute track;

connecting a first input incremental track optical fiber between the first incremental track optical coupler and proximate the layer for illuminating the first incremental track;

connecting an output absolute track optical fiber between the absolute track optical coupler and the absolute track detector for conveying reflected light from the absolute track to the absolute track detector; and connecting a first output incremental track optical fiber between the first incremental track optical coupler and the first incremental track detector for conveying reflected light from the first incremental track to the first incremental track detector.

* * * * *